United States Patent [19]
Oglesby et al.

[11] Patent Number: 4,785,793
[45] Date of Patent: Nov. 22, 1988

[54] A SOLDERING TOOL

[75] Inventors: Alfred P. Oglesby; Elizabeth A. Oglesby, both of Springhill; John P. Oglesby, Anneville; Derek W. Butler, Carlow, all of Ireland

[73] Assignee: Oglesby & Butler Technology Limited, Carlow, Ireland

[21] Appl. No.: 824,943

[22] Filed: Feb. 3, 1986

Related U.S. Application Data

[63] Continuation-in-part of Ser. No. 584,368, Feb. 28, 1984, abandoned.

[30] Foreign Application Priority Data

Mar. 2, 1983 [IE]  Ireland .................................. 442/83
Oct. 22, 1985 [IE]  Ireland .................................. 2607/85
Jan. 27, 1986 [IE]  Ireland .................................. 221/86

[51] Int. Cl.$^4$ .............................................. B23K 3/02
[52] U.S. Cl. ..................... 126/414; 126/413
[58] Field of Search ............... 126/413, 414, 236, 239, 126/228, 229, 234, 235, 408, 409, 410; 431/329, 328; 222/2; 228/51

[56] References Cited

U.S. PATENT DOCUMENTS

| | | | |
|---|---|---|---|
| 4,119,088 | 10/1978 | Sim | 126/413 |
| 4,133,301 | 1/1979 | Fujiwara | 126/413 |
| 4,243,017 | 1/1981 | Diederich | 126/409 |
| 4,361,133 | 11/1982 | Bonnema | 126/408 |
| 4,382,448 | 5/1983 | Tittert | 126/409 |
| 4,502,465 | 3/1985 | Yoshinaga et al. | 126/409 |
| 4,539,974 | 9/1985 | Tittert | 126/409 |
| 4,552,124 | 11/1985 | Nakajima | 216/413 |

FOREIGN PATENT DOCUMENTS 9602  12/1879  Fed. Rep. of Germany .

Primary Examiner—Randall L. Green
Attorney, Agent, or Firm—Sughrue, Mion, Zinn, Macpeak & Seas

[57] ABSTRACT

A soldering tool comprising a soldering tip and a handle in which is housed a fuel gas reservoir. Gas is delivered from the reservoir through the handle to a permeable gas catalytic combustion element to heat the soldering tip. The catalytic element extends around a support member. Heat is conducted from the support member into the soldering portion of the tip.

12 Claims, 11 Drawing Sheets

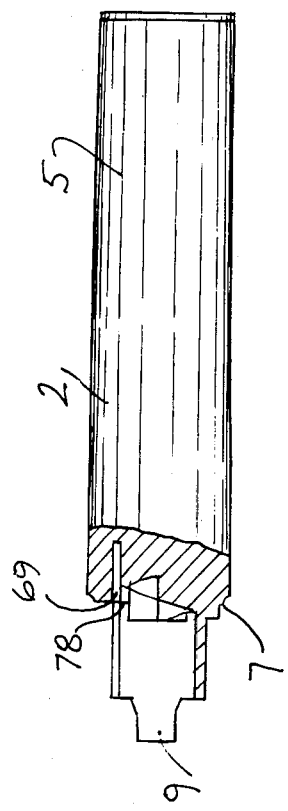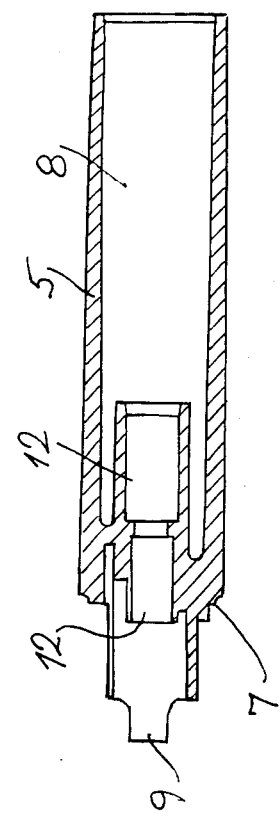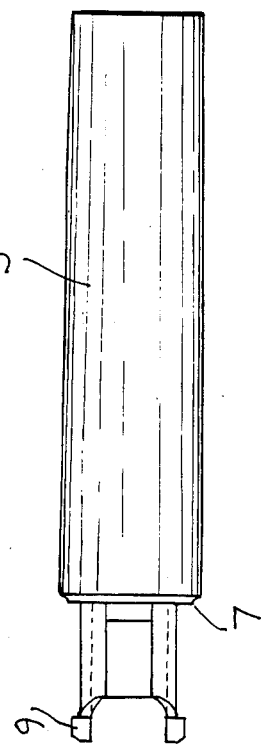

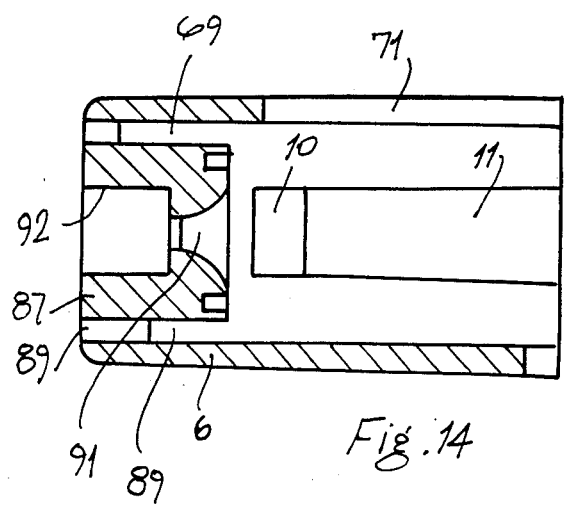
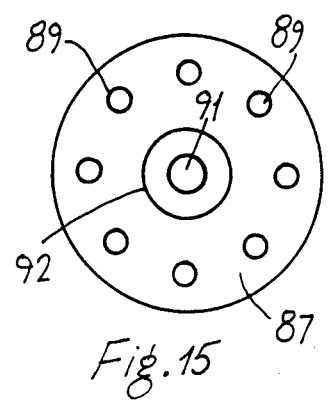
Fig. 14    Fig. 15
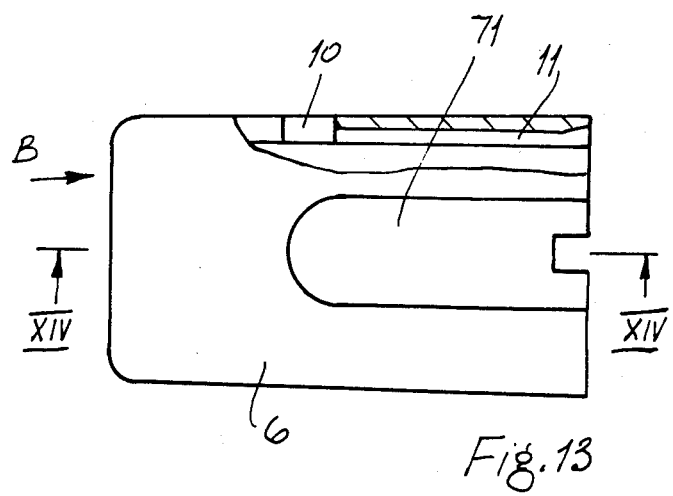
Fig. 13

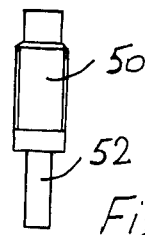
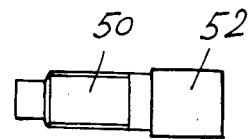
Fig. 26
Fig. 27
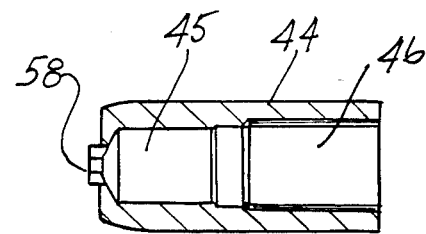
Fig. 25
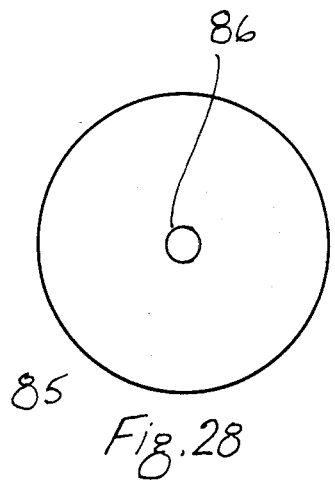
Fig. 28
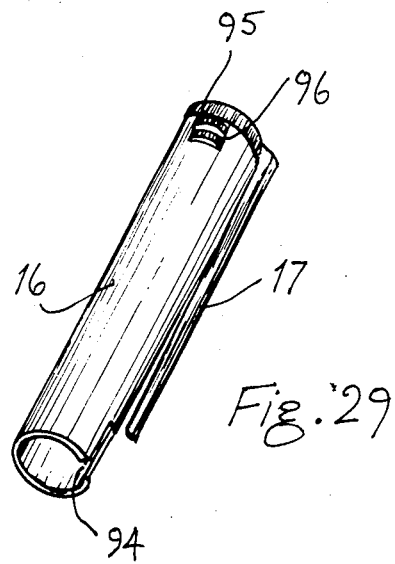
Fig. 29

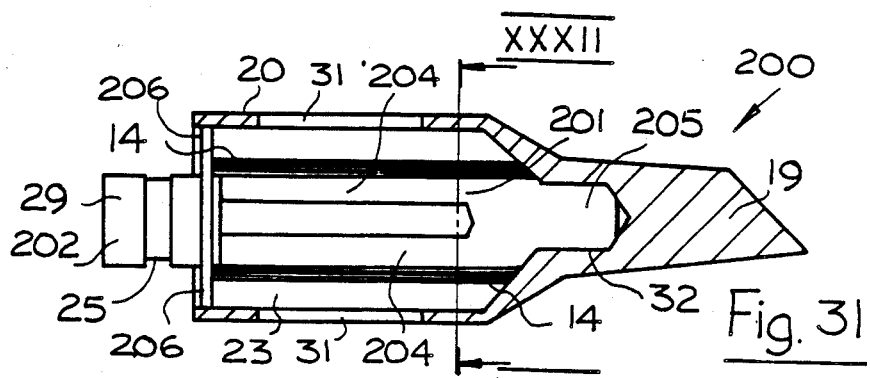
Fig. 31
Fig. 32
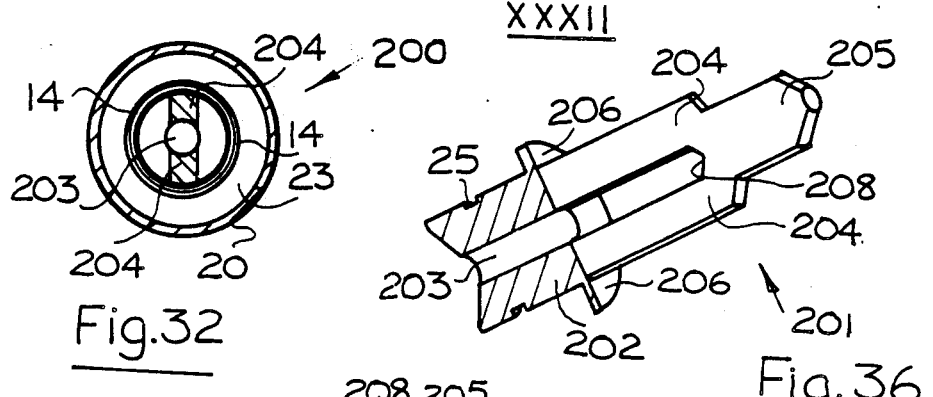
Fig. 36
Fig. 33
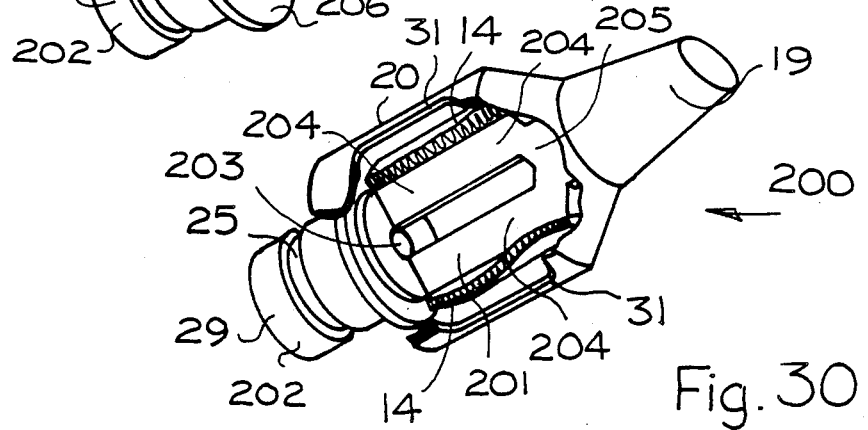
Fig. 30

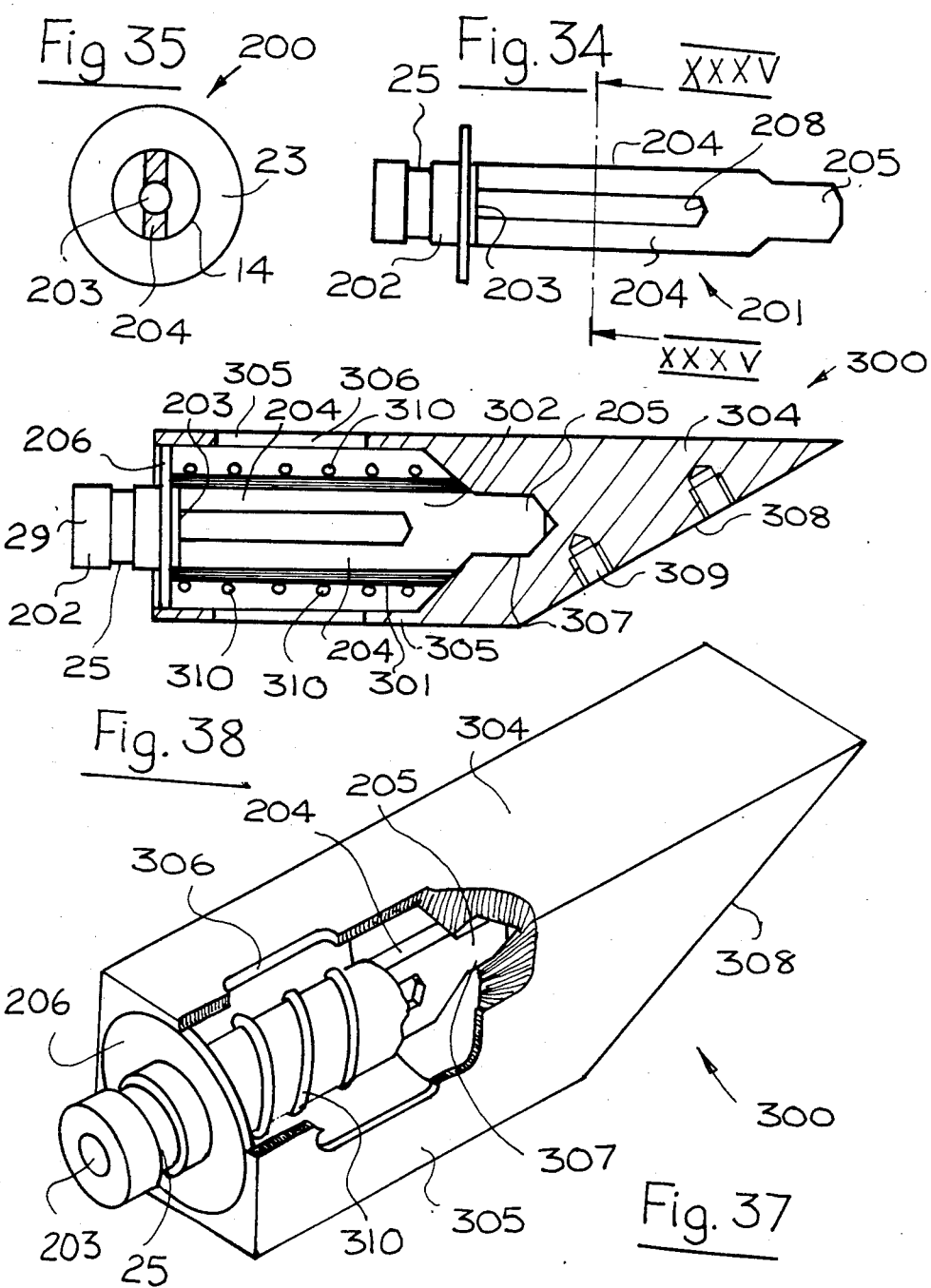

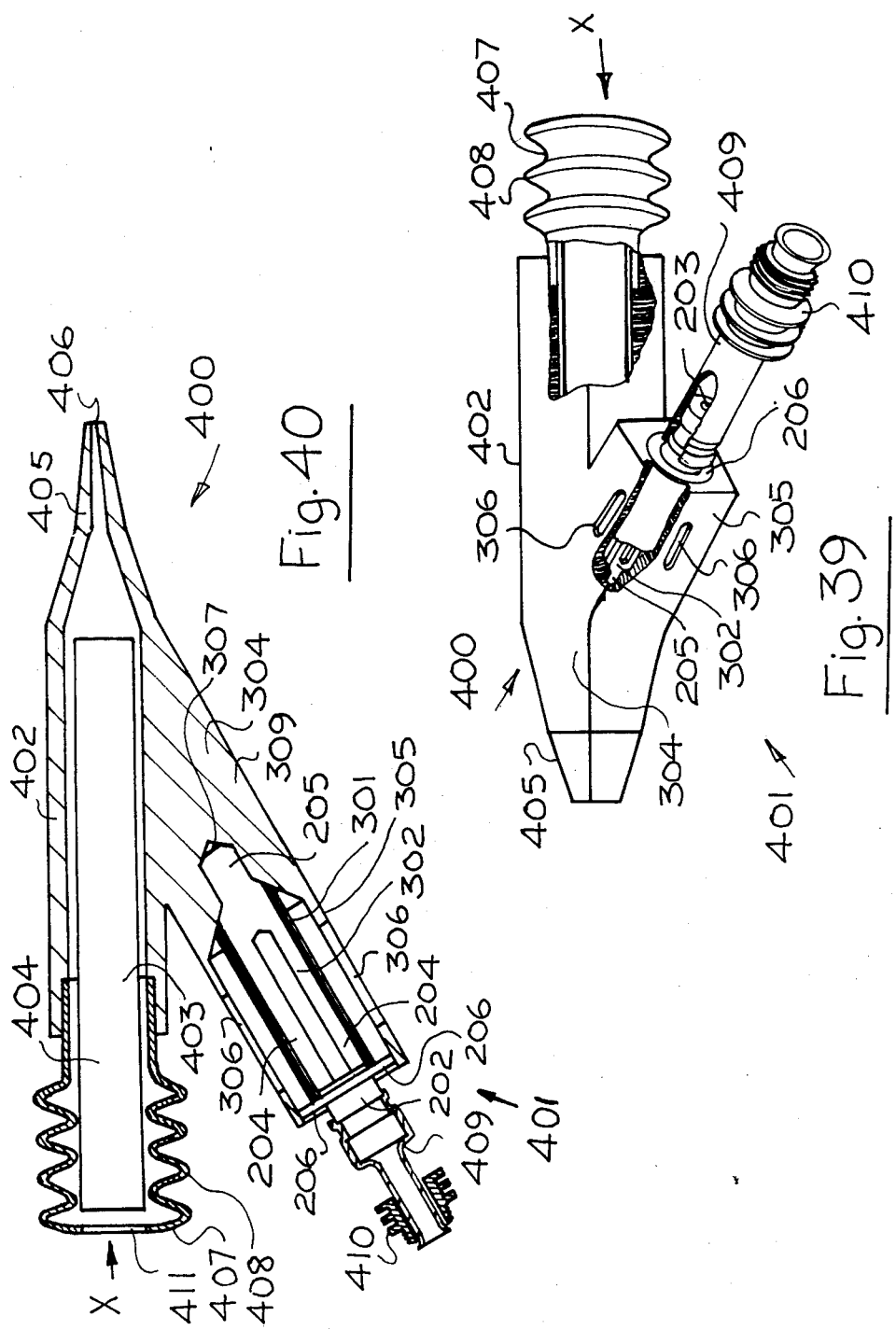

A SOLDERING TOOL

This application is a continuation-in-part application of application Ser. No. 584,368, filed Feb. 28, 1984, entitled "A Soldering Tool" (now abandoned).

BACKGROUND TO THE INVENTION

1. Field of the Invention

The present invention relates to a soldering tool and in particular, to a gas powered soldering tool, in which the soldering tip is heated by a gas catalytic combustion element. It also relates to a portable soldering tool. Further, it relates to a heating device for a gas powered heating apparatus, and also to the heating apparatus incorporating the heating device.

2. Discussion of the Prior Art

Gas powered soldering tools are known. One such device is disclosed in U.S. Pat. No. 4133301. This device comprises a soldering tip, a gas reservoir and means for selectively delivering gas from the reservoir to the soldering tip. The soldering tip comprises a soldering portion and a cylindrical member extending rearwardly from the soldering portion. The cylindrical member is packed with a permeable gas catalytic combustion element, and gas is delivered from a jet to the combustion element at the end remote from the soldering portion. The combustion element heats up and in turn heats the cylindrical member.

Heat is conducted along the cylindrical member into the soldering portion. However, this device like most other known devices, suffers from two major problems. Firstly, by virtue of the fact that heat is transferred from the combustion element to the soldering portion along the cylindrical member, only a limited amount of the heat generated in the combustion element is actually conducted to the soldering portion. Because the cylindrical member is effectively an outer shell, a considerable quantity of the heat on the shell is convected away by the surrounding air. Thus heat is thus lost to the soldering portion. A second problem with this device is that by virtue of the fact that the gas is delivered to the combustion element at one end only, even distribution of the gas throughout the combustion element is unachievable. In general, what happens in these devices is that the end of the catalytic combustion element remote from the soldering portion burns brightly and hotly, while the end adjacent the soldering portion in many cases can be quite cool. This, it will be appreciated, is a considerable disadvantage in that to obtain optimum combustion efficiency from the combustion element, it is essential that the gas should burn evenly throughout. While one of the devices described in U.S. Pat. No. 4,133,301 does attempt to deliver the gas more evenly throughout the combustion element, this device does not overcome the problem of a considerable amount of heat in the cylindrical member being lost to the surrounding air.

Thus, in use, this device and other known devices tend to be relatively inefficient in use, in that the gas is unevenly burnt in the catalytic combustion element, and secondly, because of the high heat loss from the cylindrical member, both a large quantity of fuel is required to heat the tip and also a large catalytic combustion element is also required. This further leads to a relatively bulky and cumbersome apparatus.

OBJECTS OF THE INVENTION

One object of the invention is to provide a soldering tool in which the catalytic element gives a relatively high heat output and also burns the gas efficiently and evenly throughout. Another object of the invention is to provide a soldering tool in which a relatively high heat transfer of heat from the combustion element to the soldering portion of the soldering tip is achieved. Another object of the invention is to provide a gas powered soldering tool which has a relatively small compact catalytic combustion element, so that the soldering tool is relatively compact and easily used. It is also an object of the invention to provide a portable gas powered soldering tool and it is a further object of the invention to provide a relatively compact easily assembled portable soldering tool. It is also an object of the invention to provide a gas powered soldering tool which may be operated with a single switching on action. In other words, it is an object of the invention to provide a soldering tool whereby once the gas is switched the gas may be ignited at or adjacent the catalyst by a suitable ignition means and thereafter, the soldering tool will operate without the need for further switching on and off of the gas.

Further, it is an object of the invention to provide a heating device for a gas powered heating apparatus, comprising a permeable gas catalytic combustion element, which is efficient in its use of gas and also which achieves a relatively high heat transfer from the combustion element to the portion of the apparatus to be heated. Needless to say, other objects of the heating device are similar, in general, to those set out above for the soldering tool.

It is also an object of the invention to provide a gas powered heating apparatus incorporating the heating device.

SUMMARY OF THE INVENTION

According to the invention there is provided a gas powered soldering tool comprising:

a soldering tip, said soldering tip comprising a soldering portion body of heat conductive material and an integral gas catalytic combustion element support member, the support member being of a heat conductive material, one end of which engages the soldering portion body with heat conducting engagement for conducting heat from the support member to the soldering portion body, a permeable gas catalytic combustion element mounted on the support member to receive fuel from the support member, and means for selectively delivering fuel to the support member.

In one embodiment of the invention the permeable gas catyalytic combustion element extends at least partly around the support member. Preferably, the permeable gas catalytic combustion element extends completely around the support member.

In one embodiment of the invention, the support member is a manifold having an elongated heat conductive tubular member with a plurality of radial holes in its side wall to deliver fuel to the permeable gas catalytic combustion element, one end of the manifold engaging the soldering portion body with heat conducting engagement, and the other end of the manifold being connected to the means for selectively delivering fuel.

Alternatively, the support member comprises a pair of spaced apart elongated heat conductive members extending at one end from a base member having a bore therethrough to deliver fuel between the elongated members, the other end of the elongated member being in heat conducting engagement with the soldering portion body. Preferably, the spaced apart elongated members terminate in a single heat conductive member which engages the soldering portion body with heat conducting engagement. Advantageously, the soldering portion body has an axial bore extending therein from one end thereof, and one end of the support member is sized to be fitted into the soldering portion body for effectively conducting heat internally from the support member to the soldering portion body.

In another embodiment of the invention the soldering tip comprises an elongated hollow member integral with and extending rearwardly from the soldering portion body, and around and spaced apart from the support member, to form with the support member an annular chamber for the catalytic combustion element, and at least one exhaust outlet being provided in the side wall of the hollow member for exhausting burnt gases. Preferably, the hollow member extending from the soldering portion body is a cylindrical member. Advantageously, a retaining means is provided to retain the catalytic element adjacent the support member and spaced apart from the rearwardly extending hollow member of the soldering tip.

In another aspect of the invention the catalytic element comprises a platinum plated quartz wool fibre.

In another embodiment of the inventin a handle portion extends from the manifold, the handle portion being formed by a housing which houses means for mixing air with the fuel gas, means for isolating the fuel gas from the catalytic element, and means for regulating the flow of the fuel gas being provided in the housing.

Preferably, the means to regulate the flow of gas comprises a porous member through which the gas passes, having a gas receiving phase and a non porous member adjacent the gas receiving phase of the porous member, either the porous member or the non porous member being resilient, and either the porous member or the non porous member having a dome-shaped face abutting the face of the other member, and means to deform the resilient member progressively, so that the non porous member progressively covers the gas receiving face of the porous member.

Preferably, the porous member is a filter having a dome-shaped end, and the non porous member is a resilient disc seal.

Advantageously, the housing is provided by an elongated hollow body member having an upstream end and a downstream end, a duct communicating with the manifold extending from the upstream end to the downstream end of the body member.

In a further embodiment of the invention, the means to isolate the flow of gas is provided by a sealing member sealing an orifice through a transverse member in the duct, the sealing member being movable from a position away from the orifice to a position covering the orifice.

Preferably, the sealing member is mounted on a carrier slidable in the duct, the carrier being hollow to accommodate the passage of gas therethrough, and spring-biased in an upstream direction towards the orifice, the carrier being operable by a camming member comprising a cylindrical sleeve, slidable in the duct extending around the carrier, the downstream end of the camming member bearing on a radial face extending from the carrier, and the other end of the camming member terminating in a helical camming surface bearing on a corresponding camming surface of the housing, and a spud extending from the outer surface of the camming member, engageable with a helical slot in a thumb operated slider member which extends through the housing, the slider member being slidable longitudinally in the housing for operation of the carrier.

In another aspect of the invention the said housing has a downstream end cap and the carrier terminates short of the downstream end of the housing and forms an annular opening with the downstream end cap of the housing, and the means to mix air with the fuel gas, is provided by an air duct extending through the housing to communicate with the annular opening.

Preferably, movement of the carrier to unseat the sealing member from the orifice, slightly reduces the width of the annular opening.

Advantageously, a gas outlet is provided in the end cap for communicating with the manifold, the outlet converging in a downstream direction to form a venturi.

In a further embodiment of the invention the soldering tool further comprises a reservoir for fuel gas.

Preferably, the housing extends in a general upstream direction, to form the reservoir, and a filling valve is provided in the reservoir.

In another embodiment of the invention, a cover is provided to cover the soldering tip, the cover being releasably engagable with the housing.

Preferably, the cover abuts the thumb operated slider member, to retain the slider member with the carrier in the closed position.

Additionally, the invention provides a heating device for a gas powered heating apparatus, the heating device comprising:

a permeable gas catalytic combustion element, a support member to support the permeable gas catalytic combustion element and to deliver gas through the combustion element, the support member being of a heat conductive material, and being adapted to engage portion of the apparatus to be heated with heat conducting engagement. Preferably, the permeable gas catalytic combustion element extends at least partly around the support member. Advantageously, the permeable gas catalytic combustion element extends completely around the support member.

In one embodiment of the invention the support member comprises a pair of spaced apart elongated members of heat conductive material, one end of which is adapted to engage the portion of the apparatus with heat conducting engagement, and the other end extending from a base member having a bore therethrough to deliver fuel through the elongated members to the combustion element. Preferably, the base member is a tubular member.

Advantageously, the elongated members terminate in a single heat conductive member at one end, the single member being adapted to engage the portion of the apparatus with heat conducting engagement.

In a further embodiment of the invention, a heating member of heat conductive material is provided, the heating member engaging the support member with heat conducting engagement and being adapted to engage the portion of the apparatus to be heated with heat conducting engagement. Preferably, an elongated hollow member extends rearwardly from the heating member around the support member, and spaced apart from the support member to form with the support member an annular chamber for the catalytic element, and at least one exhaust outlet being provided in the hollow member for exhausting burnt gases. Advantageously, an annular flange extends from the support member to engage the free end of the hollow member.

In another embodiment of the invention, a retaining means is provided to retain the catalytic element adjacent the support member and spaced apart from the rearwardly extending hollow member of the heating member.

Additionally, the invention provides a gas powered heating apparatus comprising the heating device.

ADVANTAGES OF THE INVENTION

The advantages of the invention are many however, one important advantage of the invention is that because of the construction of the soldering tip, in other words, the fact that the permeable gas catalytic combustion element is mounted on the support member and the support member distributes fuel relatively evenly throughout the combustion element, substantially even burning is achieved throughout the combustion element. This leads to considerable combustion efficiency in the element and also thus to increased efficiency. Furthermore, because of the fact that the support member extends into the soldering portion body of the soldering tip with heat conducting engagement heat is conducted through the support member into the soldering portion body. This considerably increases the heat transfer from the combustion element into the tip, thereby further increasing the efficiency of the soldering tool. Indeed, it has been found that a relatively high proportion of the heat from the combustion element is conducted along the support member into the soldering portion of the tip. By virtue of this fact, while heat is also conducted along the outer cylindrical member of the soldering tip, the quantity of heat is less than in soldering tools known heretofore, and thus, less heat is lost from the cylindrical member of the tip to the surrounding air.

Where the support member is provided by a manifold, relatively even distribution of gas through the catalytic combustion element is achieved and also relatively high heat transfer along the manifold into the soldering portion of the tip is also achieved. Where the support member is provided by a pair of spaced apart members, even better distribution of gas throughout the combustion element is achieved, and still relatively high heat transfer is achieved from the combustion element through the support member into the soldering portion of the tip. Further, by virtue of the fact that the distribution of heat throughout the combustion element is relatively even, the combustion element in the soldering tool according to the present invention can be considerably smaller for the same heat output, as in soldering tools known heretofore. Additionally, because of the fact that greater heat transfer from the combustion element into the soldering portion is achievable, a more efficient tool is provided. Thus, the tool can be relatively smaller and more compact than tools known heretofore.

A further advantage of the invention is that the soldering tool may be operated with only one starting action. All that is required is to deliver gas to the combustion element, and ignite the gas passing through the element. The catalytic element is then brought to its ignition temperature, and the flames go out and the catalytic element continues to burn the gas. This, it will be appreciated, overcomes the major problem of soldering tools known heretofore, where it has been necessary to switch off the gas to quench the flame after the catalytic element has been brought to its ignition temperature, and then switch on the gas again.

Furthermore, because the catalytic combustion element is permeable, considerably greater heat transfer can be achieved between the catalytic element and the soldering tip of the tool.

A further advantage of the invention is that because of the construction of the manifold and the soldering tip, and the exhaust outlets in the soldering tip, a relatively even distribution of gas is achieved throughout the catalytic combustion element, thereby leading to considerable combustion efficiency. Also, because of the construction of the manifold and soldering tip, a relatively efficient transfer of heat from the combustion element is achieved. Advantageously, because the combustion element is permeable, a relatively small element can be used to give the required amount of heat. This, it will be appreciated, permits a relatively small compact soldering tool, which is ideally suited as a portable tool.

These, and other objects and advantages of the invention, will be readily apparent from the following description of a preferred embodiment thereof, which is given by way of example only, and does not limit the scope of the invention:

BRIEF DESCRIPTION OF THE DRAWINGS

FIG. 10 is a partly sectional side elevational view of another portion of a soldering tool of FIG. 1, FIG. 11 is a sectional side view of the portion of FIG. 10, FIG. 12 is a plan view of the portion of FIG. 10, FIG. 13 is a partly sectional plan view of another portion of the soldering tool of FIG. 1, FIG. 14 is a sectional side view of the line XIV—XIV of the portion of FIG. 13, FIG. 15 is an end view of the portion of FIG. 13 in the direction of the arrow B of FIG. 13, FIG. 25 is a sectional view of another portion of the soldering tool of FIG. 1, FIG. 26 is a side elevational view of another portion of the soldering tool of FIG. 1, FIG. 27 is a plan view of the portion of FIG. 26, FIG. 28 is an end view of a further portion of the soldering tool of FIG. 1, FIG. 29 is a perspective view of a cover of the soldering tool of FIG. 1, FIG. 30 is a partly cut-away perspective view of a soldering tip of a soldering tool according to another embodiment of the invention, FIG. 31 is a cross-sectional side elevational view of the soldering tip of FIG. 30, FIG. 32 is a sectional end view of the soldering tip of FIG. 30 on the line XXXII—XXXII of FIG. 31, FIG. 33 is a perspective view a portion of the soldering tip of FIG. 30, FIG. 34 is a side view of the portion of FIG. 33, FIG. 35 is a sectional end view of the portion of FIG. 33 on the line XXXV—XXXV of FIG. 34, FIG. 36 is a partly sectional perspective view of the portion of FIG. 33, FIG. 37 is a perspective view of a heating device also according to the invention, FIG. 38 is a sectional view of the heating device of FIG. 37, FIG. 39 is a perspective view of a heating device according to another embodiment of the invention, and FIG. 40 is a cross-sectional view of the heating device of FIG. 39.

DETAILED DESCRIPTION OF THE INVENTION

Figures 1, 2, 3, 4:
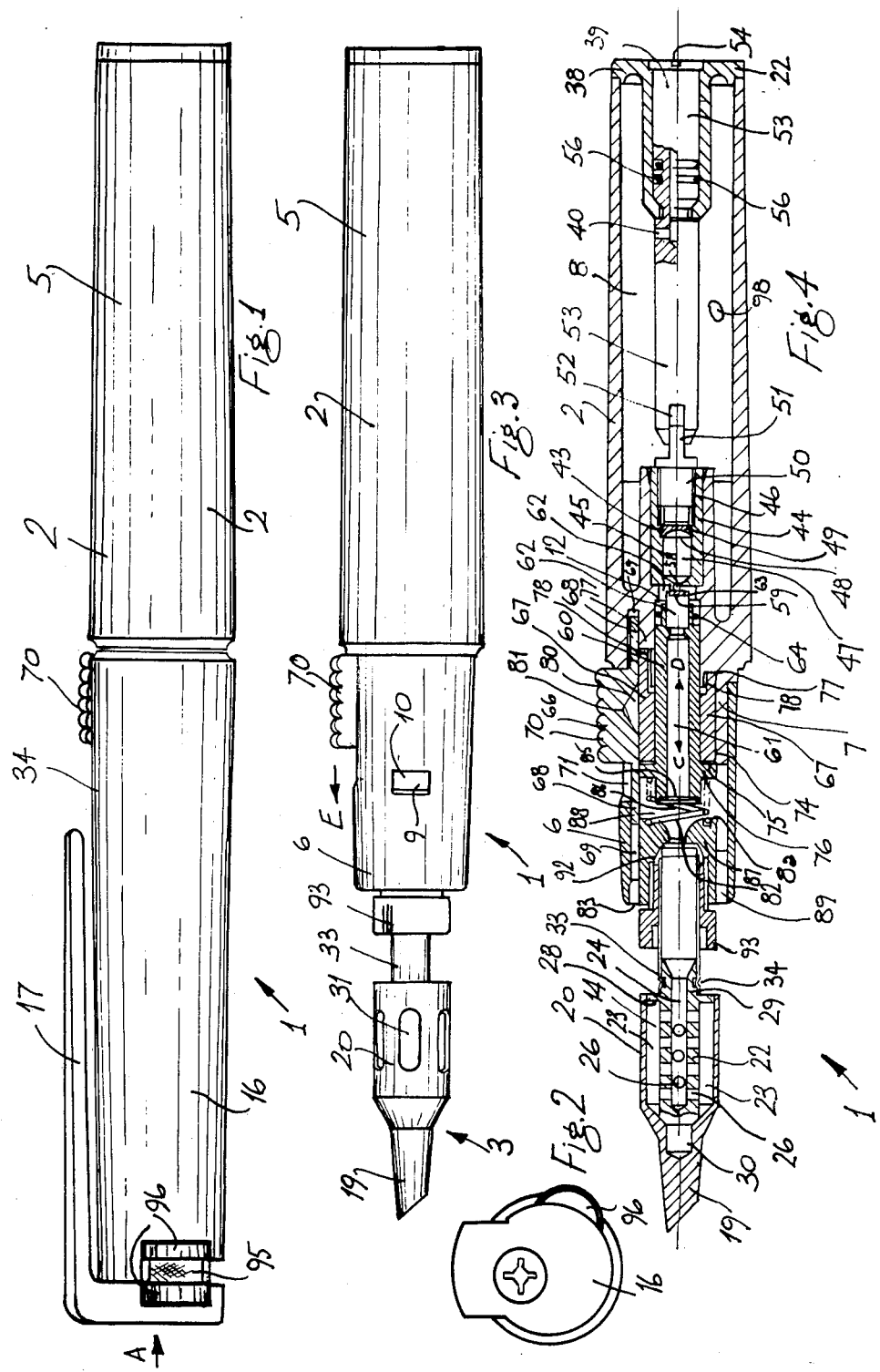
FIG. 1 is a side elevational view of a soldering tool according to the invention.
FIG. 2 is an end view in the direction of the arrow A of FIG. 1 of the soldering tool.
FIG. 3 is a side elevational view of the soldering tool of FIG. 1 with the cover removed from the tool.
FIG. 4 is a sectional side view of the soldering tool of FIG. 1 with the cover removed.

Referring to the drawings, and initially to FIGS. 1 to 29 thereof, there is provided a gas powered soldering tool according to the invention in this case, a portable soldering tool indicated generally by the reference numeral 1. The soldering tool 1 comprises a handle 2 and a soldering tip 3. The handle 2 comprises a a hollow upstream housing 5 and a hollow downstream housing 6 of plastics material, joined together at 7 by a pair of clips 9 extending from the housing 5 which engage corresponding openings 10 in the housing 6. Lead in grooves 11 in the housing 6 direct the clips 9 into the openings 10 for ease of assembly. A reservoir 8 for liquid fuel gas is formed in the upstream housing 5. A duct 12 through the upstream housing 5 and the downstream housing 6 delivers gas as will be described below, to a permeable gas catalytic combustion element 14 which heats the soldering tip 3. A cover 16 releasably engages the handle 2, to cover the soldering tip 3, and a pocket clip 17 is provided for clipping the soldering tools to a breast pocket.

Dealing now with the soldering tip 3 and the catalytic element 14. These are clearly illustrated in FIGS. 3 and 4 and FIGS. 6 to 9. The soldering tip 3 is of a heat conducting material, in this case brass, and comprises a soldering portion body 19 and a rearwardly extending hollow cylindrical portion 20. A catalytic element support member to support the catalytic element 14 is provided by a manifold 22 of heat conductive material in this case brass. The manifold 22 forms with the cylindrical portion 20 an annular chamber 23 in which the catalytic element 14 is mounted supported on the manifold 22. One end of the manifold 30 is of reduced diameter and extends into a bore 32 in the soldering portion 19 of the tip 3 to engage the portion 19 in heat conducting engagement, so that heat is conducted through the manifold 22 from the catalytic element 14 into the soldering portion 19. A flange 28 at the other end of the manifold 22 closes the chamber 23 against the cylindrical portion 20 of the tip 3. The manifold 22 has a cylindrical portion 35 and gas is delivered through an inner bore 24 through radial holes 26 and in turn through the catalytic element 14. A stainless steel tube 33 crimped at 34 onto a groove 25 at the end 29 of the manifold 22 connects the manifold to the handle 2, as will be described below. The catalytic element 14 is permeable and in this case comprises platinum plated quartz wool. Gas on passing through the catalytic element 14 from the holes 26 burns. Exhaust outlets 31 in the cylindrical portion 20 of the soldering tip 3 disperse burnt gas. In this case, the outlets 31 are provided at 60° around the cylindrical portion 20 to ensure that in combination with the radial holes 26 of the manifold 22, a full and even distribution of gas through the catalytic element 14.

Thus, heat from the catalytic element 14 is conducted to the soldering portion 19 of the tip 3 through the manifold 22 and through the cylindrical portion 20. This maximises heat transfer into the soldering portion 19. In fact, it has been found that by virtue of the fact the heat is conducted through the manifold, a considerably higher heat transfer into the tip portion 19 is achievable than in soldering tools known heretofore. Furthermore, by virtue of the fact that the heat is conducted through the manifold, less heat is therefore conducted through the cylindrical portion 20, which is thus at a lower temperature than soldering tools known heretofore, and thus, less heat is lost from the cylindrical portion 20 to the surrounding air than in known soldering tools. Furthermore, by virtue of the fact that gas is delivered to the catalytic element 14 through the radial holes 26, a relatively even distribution of gas throughout the catalytic element is achieved and this leads to relatively high combustion efficiency of the fuel in the catalyst. In fact, it has been found that the combustion efficiency is considerably higher than soldering tools known heretofore.

The upstream housing 5 is illustrated in FIGS. 3, 4, 10 and 11. An end cap 38 of plastics material welded to the housing 5 closes the housing 5 and forms the reservoir 8. A filling valve 39 is provided in the end cap 38, to deliver liquid fuel gas into the reservoir 8 through an inlet 40. Such a filling valve will be well known to those skilled in the art, and it is not intended to describe it in detail in this specification.

Figure 24:
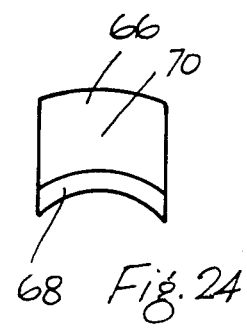
FIG. 24 is an end view of the portion of FIG. 21.
Figure 22:
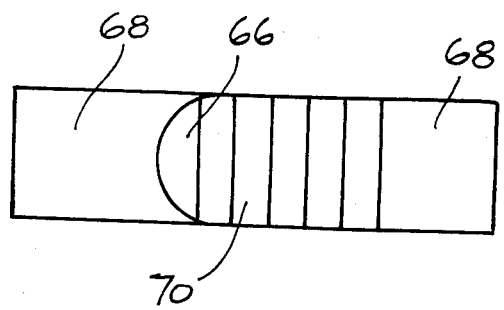
FIG. 22 is a plan view of the portion of FIG. 21.

A means to regulate the flow of gas to the manifold 22 is provided at 43 in the duct 12 in the upstream housing 5. The regulating means comprises a bush 44 of brass which is a press fit in the duct 12. The gas flows through a bore 45 in the bush 44. A porous member, in this case a cintered bronze filter 47 with a domed end 48 is mounted in one end of the bore 45 of the bush 44. The other end 46 of the bore 45 is partly threaded. A non porous member, in this case a resilient disc seal 49, of silicone rubber, is loosely mounted in the bore 45, and kept in contact with the domed end 48 of the filter 47 by a screw 50. The screw 50 loosely engages the threads 46 and permits the passage of gas along the threads to the filter 47. The seal 49 being loose in the bore 45 allows the passage of gas to the filter 47. The bush 44 and screw 50 are illustrated in FIGS. 24 to 26. A flat portion 51 on the screw 50 engages a slot 52 on a shaft 53, which is rotatable in the end cap 38. A screwdriver slot 54 is provided at the end of the shaft 53. Sealing rings 56 in the end cap 38 prevent leakage of gas along the shaft 53. On rotation of the screw 50 by the shaft 53, the disc seal 49 is deformed onto the domed end 48 of the filter 47. As the seal 49 is progressively deformed, the surface area of the domed end 48 through which gas may pass, is reduced, thereby decreasing the flow of gas. Decreasing or increasing this area by tightening or loosening the screw 50, thus regulates the flow of gas from the reservoir 8. An orifice 58 from the bore 45 in the bush 44 permits gas to exit through the other end of the filter 47.

Figure 5:
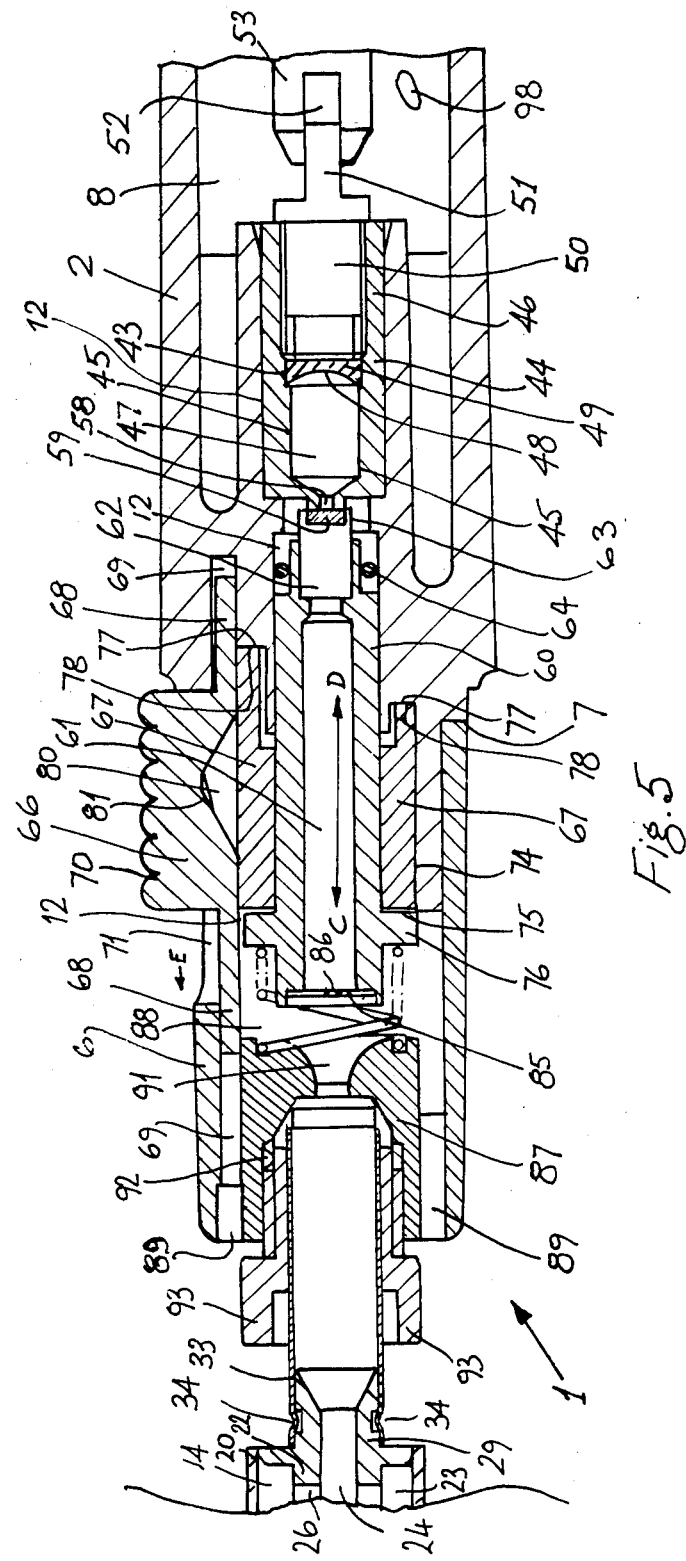
FIG. 5 is an enlarged sectional side view of portion of the soldering tool of FIG. 1.
Figure 6:
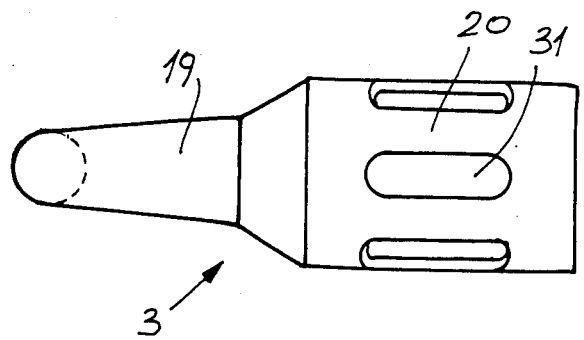
FIG. 6 is a side elevational view of portion of the soldering tool of FIG. 1.
Figure 7:
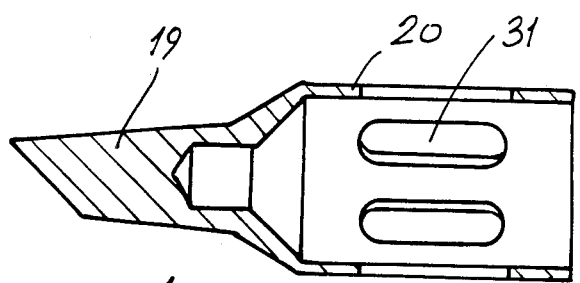
FIG. 7 is a sectional side view of the portion of the tool illustrated in FIG. 6.
Figure 8:
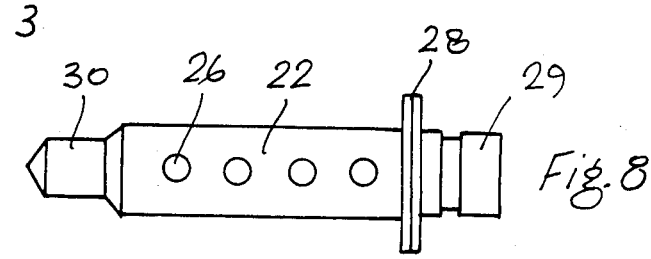
FIG. 8 is a side elevational side of another portion of the soldering tool of FIG. 1.
Figure 9:
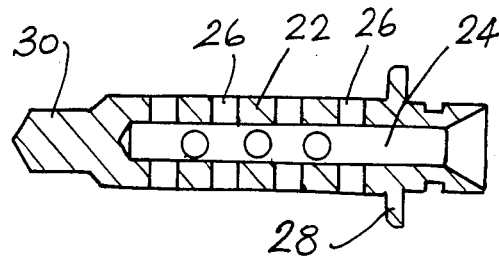
FIG. 9 is a sectional side view of the portion of FIG. 8.
Figure 16:
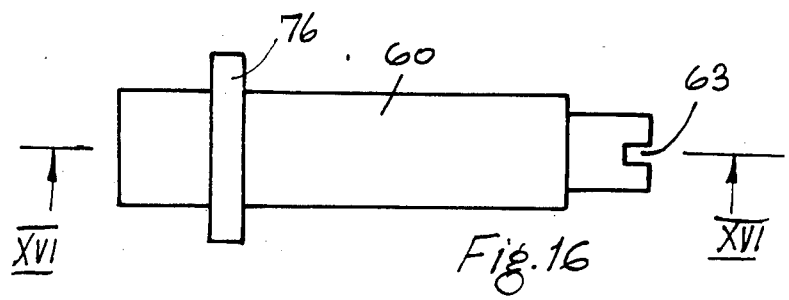
FIG. 16 is a plan view of another portion of the soldering tool of FIG. 1.
Figure 17:
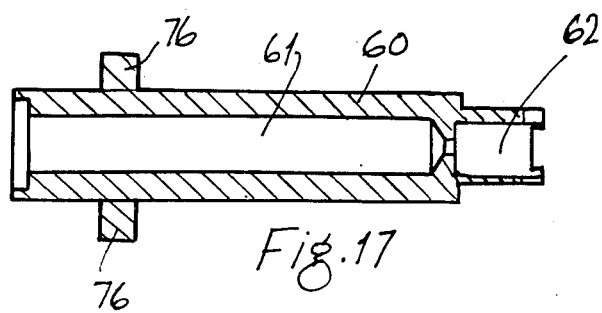
FIG. 17 is a sectional side view of the portion of FIG. 16 on the line XVII—XVII.
Figure 18:
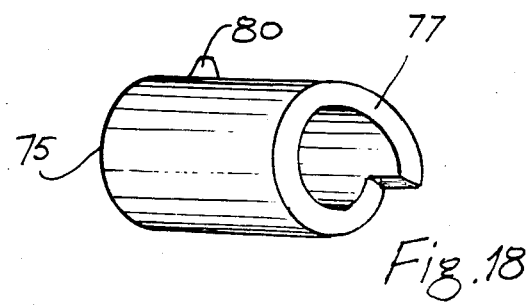
FIG. 18 is a side elevational view of another portion of the soldering tool of FIG. 1.
Figure 20:
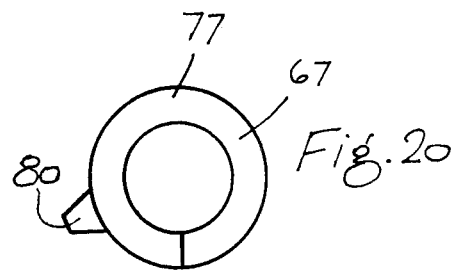
FIG. 20 is an end view of the portion of FIG. 18.
Figure 19:
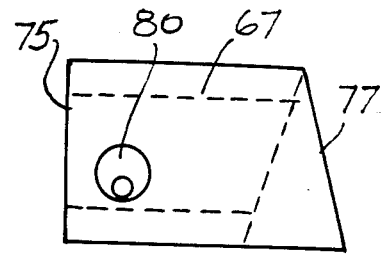
FIG. 19 is a plan view of the portion of FIG. 18.
Figure 23:
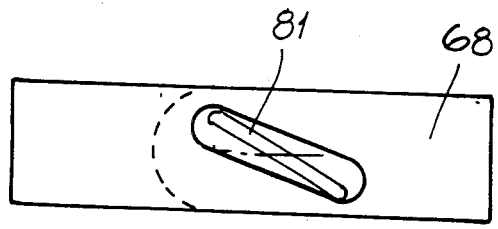
FIG. 23 is an underneath plan view of the portion of FIG. 21.
Figure 21:
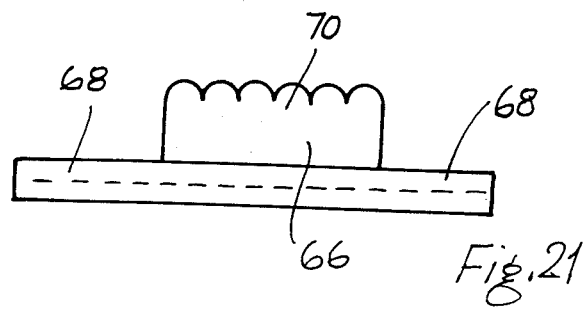
FIG. 21 is a side elevational view of another portion of the soldering tool of FIG. 1.

A means to isolate the flow of gas to the manifold 22 is provided by a sealing member, in this case, a silicone disc seal 59, which seals against the orifice 58. The disc seal 59 is mounted on a carrier 60, slidable in the duct 12 of the upstream housing 5, for moving the disc seal 59 towards and away from the orifice 58 to effect sealing. The carrier 60, as well as being illustrated in FIGS. 4 and 5, is also illustrated in detail in FIGS. 17 and 18. A compression spring 82 acts between a radial flange 76 on the carrier 60, and the downstream housing 6 to bias the carrier 60, and in turn the disc seal 59 towards the orifice 58. The carrier 60 is of brass and hollow, having a central bore 61 through which the gas passes. A cintered bronze filter 62 mounted in the carrier 60 adjacent the disc seal 59, further filters the gas as it passes through the carrier 60. A plurality of radial openings 63 in the carrier 60, allow gas to enter the bore 61 through the filter 62. An O-ring seal 64 prevents the passage of gas between the carrier 60 and the side of the duct 12.

The carrier 60 is operable in the direction of the arrows C and D by a thumb operated slider 66, which operates a camming member 67. The slider 66 of nylon is slidable in the upstream and downstream housings 5 and 6, by means of a base 68 which engage corresponding slots 69 in the housings 5 and 6. A thumb portion 70 extends through a slot 71 in the upstream and downstream housings 5 and 6.

Both the camming member 67 and thumb slider 66, as well as being illustrated in FIGS. 4 and 5, are also illustrated in detail in FIGS. 18 to 24. The camming member 67 is a cylindrical sleeve of nylon slidable and rotatable in the housing 5. The camming member 67 is also rotatable on the carrier 60. One end 75 of the camming member 67, engages the radial flange 76 on the carrier 60. The other end of the camming member 67 terminates in a helical camming surface 77, which bears on a corresponding helical camming surface 78 in the housing 5. A spud 80 on the other surface of the camming surface 67, engages a slightly helical groove 81 in the slider 66. On movement of the slider 66 in the direction of the arrow E, the camming member 67 is rotated by virtue of the engagement of the spud 80 in the groove 81 of the slider 66. This rotation causes the camming surfaces 77 and 78 to interact, thereby moving the camming member 67, and in turn the carrier 60 in the direction of the arrow C, thus lifting the disc seal 59 from the orifice 58 to permit the flow of gas. Reverse movement of the slider 66 closes off the flow of gas.

A disc 85 of stainless steel, is pressed into the carrier 60 at the downstream end of the bore 61. An orifice 86 in the disc 85 forms a jet through which gas is delivered into the duct 12 in the downstream housing 6. The downstream end of the housing 6 is closed, thus forming an end cap 87. As can be seen in FIG. 5, the carrier 60 terminates just short of the end cap 87, thereby providing an annular opening 88 between the carrier 60 and the end cap 87. This acts as a means for mixing air with the fuel gas. A plurality of circular bores 89 through the end cap 87, deliver air into the annular opening 88. An outlet 91 for the gas/air mixture is provided in the end cap 87, and as can be seen in FIG. 5, it converges in a downstream direction, thereby forming a venturi. As gas exits through the orifice 86, it mixes with the air coming in through the annular opening 88, and thereby proceeds through the venturi outlet 91. The outer end 92 of the outlet 91 is threaded to receive a collet 93 for securing the tube 33 in the end cap 87. The gas/air mixture is thus delivered from the outlet 91 through the tube 33 into the manifold 22.

Dealing now with the cover 16, the cover is clearly illustrated in FIG. 29. A slot 94 is provided in the cover 16 to abut the slider 66. When the cover 16 is in the position on the handle 2, the slot 94 retains the slider 66 in the closed position, namely, with the carrier 60, and in turn the disc seal 59 closing the orifice 59. A flint ignition mechanism 95 is provided at the other end of the cover 16 for igniting the gas in the catalytic element 14. Thumb operated wheels 96 operate the flint mechanism 95 to produce sparks. Such flint ignition mechanisms are well known to those skilled in the art, and it is not intended to deal with this mechanism in further detail.

A charcoal filter 98 is provided in the reservoir 8 to remove any impurities from the liquid gas.

In use, the reservoir is filled with liquid butane gas, for example, the type used in cigarette lighters. The cover 16 is removed from the handle 2. The slider member 66 is moved in the direction of the arrow E, thereby opening the orifice 58 and permitting gas to flow from the reservoir 8 to the manifold 22. The flint mechanism is held adjacent the exhaust outlets 31, and sparks are generated. The sparks ignite the gas passing through the outlets 31, and the catalytic element 14 is brought up to its operating temperature. Once the catalytic element reaches normal operating temperature, the flames automatically go out, and the catalytic element burns the gas. Heat is thereby transferred from the catalytic element through the manifold 22 as well as through the cylindrical portion 20 and into the soldering portion 19, and the tool is ready for soldering. In the present embodiment of the invention, it has been found in general that the catalytic element reaches normal operating temperature within 20 seconds.

Where too much or too little gas flows to the element 14, the gas flow is regulated by means of the regulator 43. By rotating the shaft 53, the domed area 48 of the filter 47 covered by the seal 49 is varied, thereby varying the flow of gas to the element 14.

By varying the flow of gas to the element, the element glows at a brighter or darker shade. In general, the element glows red, and at its maximum heat it glows a bright red, while at a lower heat it glows a dark red, and in fact, in some cases, it has been found that the glow is hardly perceptible at all. The advantage of this is that by inspecting the shade of the colour, an operator can readily easily assess the temperature at which the tip is.

In fact, it is envisaged in certain cases, that a shade card, indicating the corresponding temperatures, may be provided with the soldering iron, or attached to the handle. This would permit an operator to readily easily assess the temperature of the tip of the tool.

The soldering tool is switched off by moving the slider member 66 in an upstream direction, namely, the direction of the arrow D to the position illustrated in FIGS. 3 and 4. The cover 16 is then placed over the tip onto the handle 2. Alternatively, the soldering tool 1 may be switched off by merely pressing the cover onto the handle 2, and the slot 94 thereby moves the slider 66 into the closed position.

While the soldering tool of the present invention has many advantages which have been described above over soldering tools known heretofore, another advantage of the tool is that it can be operated, and in particular started, without any difficulty. All that is required is to place a spark or match to the gas as it exits through the exhaust outlets 31 in the tip 3. There is no need to switch the gas on and off to convert the burning phase of the gas from a flame to a glow in the catalytic element. This is mainly achieved by virtue of the fact that a permeable gas catalytic element has been used.

Referring now to FIGS. 30 to 36, there is illustrated a soldering tip 200 according to another embodiment of the invention for use in a soldering tool. In this case, the tip 200 is substantially similar to the tip 3 described with reference to FIGS. 1 to 29, and similar components are identified by the same reference numeral. In this case, the soldering tip 200 comprises a soldering portion 19 of brass, with a cylindrical portion 20 extending rearwardly therefrom. Exhaust gas outlet slots 31 are provided in the cylindrical portion 20. A support member for the catalytic element 14 is provided by a support member 201. The support member 201 is of brass and comprises a tubular base member 202 with a bore 203 extending therethrough. A pair of elongated support members 204 extend from the base 202. The support members 204 terminates in a single member 205 which extends into a bore 32 in the tip portion 19 of the soldering tip 200. The member 205 engages the bore 32 with heat conducting engagement, so that the heat from the catalytic element 14 is conducted into the soldering portion 19. A permeable gas catalytic combustion element 14 extends around the support members 204 and gas is delivered from the bore 203 between the support members 204 to the catalytic element 14. The burnt exhaust gases are exhausted through the exhaust outlets 31.

A groove 25 is provided on the end 29 of the base member 202 for connecting the support member to a tube (not shown) for fuel delivery. A flange 206 extends from the base member 202 to engage the cylindrical portion 20 of the soldering tip 200.

In this particular embodiment of the invention, the support member 201 is manufactured from a solid piece of brass. The brass is turned firstly to the diameter of the outer dimensions between the support members 204. The single member 205 and the base member 202 are then turned and the groove 25 in the base member is similarly turned. The bore 203 in the base is drilled and extends to the point 208 towards the end of the support member. Material is then milled from both sides of the turned component to form the support member 204 and expose the bore 203. Needless to say, any other suitable manufacturing arrangement could be used.

In use, this soldering tip is substantially similar to that described, fuel is delivered through the bore 203 of the base 202 from a tube (not shown) and passes between the support members 204 to be delivered through the catalytic element 14 for combustion therein.

It will be appreciated that while this soldering tip, and indeed, the soldering tip described with reference to FIGS. 1 to 29 have been described for use in a soldering tool, they could, in fact, be used in any other gas powered heating apparatus, for example, in a glue gun, which will be described below, a clothes pressing iron, or indeed in any other gas powered heating apparatus.

Referring now to FIGS. 37 and 38 there is illustrated a heating device 300 for use in any gas powered heating apparatus, for example, it could be used in a soldering iron, a clothes pressing iron, a glue gun, or the like. In this case, the device operates in a substantially similar fashion to the soldering tips described in the embodiments of the invention with reference to FIGS. 1 to 36. This device 300 comprises a permeable gas catalytic element 301 mounted on a catalytic element support member 302. In this case, the support member is identical to that described with reference to FIGS. 37 and 38 and similar parts are identified by the same reference numerals. In this case, the heating device comprises a heating member 304 for conducting heat from the catalytic combustion element to portion of the apparatus to be heated, for example, in the case of a gas powered clothes pressing iron to the hot plate thereof. The heating member 304 is of a heat conductive metal, in this case copper, and a hollow portion 305 extends rearwardly around the support members 302 and the catalytic element 301. Exhaust outlets 306 are provided in the hollow portion 305 for exhausting burnt gases. A bore 307 in the heating member 304 engages the single member 205 of the support member 302 with heat conducting engagement for conducting heat through the support member 302 from the catalytic element 301 to the heating member 304. Thus, heat is conducted from the catalytic element 301 to the heating member 304 through the support member 302 and also through the hollow portion 305.

Additionally, in this embodiment of the invention a retaining means to retain the catalytic combustion element 301 adjacent the support member 302 and to prevent it touching the hollow member 305 is provided. The retaining means is provided by a spring 310 wound round the outer surface of the catalytic element 301. Needless to say, any other suitable retaining means could be used, for example, gauze wire mesh or any suitable mesh, wire clips or the like, extending around most or at least portion of the catalytic element 301. It has been found that by leaving clearance between the catalytic element 301 and the wall of the hollow member 305 a more even distribution of gas throughout the catalytic element 301 is achieved.

An angled surface 308 is provided on the heating member 304 for engagement with portion of the apparatus to be heated to increase heat transfer. Threaded holes 309 are provided for securing the heating member 304 to the apparatus. Needless to say, if desired the heating member 304 could be inserted into a corresponding bore in the portion to be heated. In which case it is envisaged that the outer surface of the heating member would be of circular cross-section.

Referring now to FIGS. 39 and 40 there is illustrated a glue gun 400 according to another embodiment of the invention, which includes a heating device 401, also according to the invention. In this case, the glue gun 400 comprises a body member 402 of aluminium alloy, with a bore 403 of circular cross-section to receive a stick of glue 404. A nozzle 405 with a bore 406 extends from the body member 402 to dispense the heated glue. A flexible sealing bellows member 407 provided by a concertina type member 408 is provided at the end of the body member 402 for fitting over the glue stick to prevent melted glue leaking from the bore 406. Glue is dispensed through the nozzle 405 by depressing the glue stick 404 and the bellows member 407 in the direction of the arrow X, which advances the glue stick through the bore 403 and in turn dispenses heated liquid glue through the nozzle 405. An opening 411 is provided in the member 407 to accommodate the glue stick 404. The heating device 401 extends from the body member 402 and is substantially similiar to the heating device illustrated in FIGS. 37 and 38, and similar components are identified by the same reference numerals. In this case, the heating device 401 conducts heat through a heating member 304 which is formed integrally with the body member 402 to the bore 403 to melt the glue. A hollow member 305 extends from the heating member 304 and surrounds a permeable gas catalytic combustion element 301 mounted on a support member 302. The support member 302 engages the heating member 304 with heat conducting engagement by means of a single member 205 engaging a bore 307 in the heating member 304. As can be seen, the support member 302 comprises a pair of spaced apart members 204 extending from a base member 202. A flange 206 extending from the base member 202 closes the hollow member 305. A bore 203 through the base member 202 delivers gas between the support members 204 and thus into the catalytic element 301. A tube 409 extends from the base member 202 to deliver gas into the support member 302, and in turn, to the catalytic combustion element 301. A nut 410 on the tube 409 secures the tube to a suitable gas delivery means, for example, to the handle 2 of the soldering tool of FIGS. 1 to 29. Circumferential fins 412 around the nut 410 dissipate heat from the nut and in turn from the tube 409, thus preventing an excess of heat travelling into the fuel supply control apparatus.

While the heating devices of FIGS. 37 to 40 have been described for use with, for example, a gas powered clothes pressing iron and a glue gun, they could be used for heating any other apparatus. Needless to say, it will be appreciated that the heating member could be of any other desired shape or construction. In fact, in certain cases it is envisaged that the rearwardly extending hollow portions may be dispensed with. In which case, heat transfer would only be through the support member into the heating member. Further it is envisaged in certain cases that the heating member could be dispensed with altogether. In which cases, the catalytic element support member would directly engage the portion of the apparatus to be heated with heat conducting engagement.

It will be appreciated that while in the embodiment of the invention described with reference to FIGS. 37 and 38, a retaining means has been described for retaining the catalytic element to contact with the support member 302 and away from the hollow member 304, this is not necessary, although it is advantageous. Furthermore, it will be appreciated that such a retaining member could be used in the heating devices of FIGS. 39 and 40 or in the soldering tips of the embodiments of the invention described with reference to FIGS. 1 to 29 or FIGS. 30 to 36. Needless to say, other suitable retaining means besides a spring or mesh could be used.

It will, of course, be appreciated that while in the embodiments of the invention described with reference to FIGS. 30 to 40, ignition systems have not been described, any suitable ignition system could be used, as desired, typical ignition systems could be a flint spark which would be directed at the exhaust outlet slots, which would ignite the gas exiting through the slots, thus causing the catalyst to heat up to its ignition temperature and thus the gas would then burn in the catalyst. Another alternative ignition system could be a hot wire ignition system, which may be powered by any suitable electrical source, for example, a battery. The hot wire would normally be of platinum alloy and would be mounted adjacent the catalyst. In the case of hot wire ignition system, the hot wire could be used to ignite the gas to in turn bring the catalytic element up to its ignition temperature, or alternatively bring the catalytic element up to its ignition temperature by direct contact with the catalytic element. Another alternative ignition system would be a piezo electric ignition device, which would ignite the gas adjacent the catalyst.

While the soldering tool of FIGS. 1 to 29 has been described as being a portable soldering tool, it could equally well be powered from a remote gas source by a flexible lead. This, of course, will be readily apparently to those skilled in the art. Additionally, while a particular type of permeable catalytic combustion element has been described, for use in the soldering tools and the heating devices, other suitable permeable catalytic elements could be used. For example, other platinum plated carriers could be used, or other carriers plated with other gas reactive metals could be used. Furthermore, platinum or other gas reactive metals could be used without a carrier, or other metals which cause a catalytic reaction with gas, could similarly be used. In fact, it is envisaged in certain cases, that a ceramic catalytic element could be used, provided that the ceramic element was porous, to permit the passage of gas through the element.

Additionally, it will be appreciated that soldering tips of other shapes and configuration and materials, could be used besides those described. It will also be appreciated that it is not necessary for the tip of the soldering tool to extend around the catalytic element, although, needless to say, this is preferable. Additionally, it is not necessary for the exhaust outlets in the hollow or cylindrical portions of the soldering tip or heating device to be arranged at 60°. In fact, they could be arranged at any suitable position. Indeed, in certain cases it is envisaged that only one exhaust outlet may be provided. Although, the advantage of having more than one is that it improves dispersion of the gas through the catalytic element. Indeed, it will be appreciated that exhaust outlets of other shapes and configurations, may be used. In fact, it is envisaged in certain cases, that the outlet may be a continuous helical slot extending over the surface of the hollow or cylindrical portions.

Further, it will be appreciated that it is not necessary for the catalytic element to extend entirely around the support member or manifold, any other configuration of catalytic element could be used without departing from the scope of the invention. For example, in certain cases it is envisaged that the catalytic element support member and catalytic element may lie side by side. Further, it will be appreciated that it is not necessary for the manifold to have a plurality of holes, one outlet is all that is required.

Where the support member is provided by a pair of elongated members as in the case of the embodiments of the invention described with reference to FIGS. 30 to to 40, other suitable configurations of support members could be used besides those illustrated. For example, in certain cases, it is envisaged that instead of providing two support members, a single support member could be used. It will also, of course, be appreciated that more than two support members could be used, for example, three, four or more. Further, it will be appreciated that while the support members have been described as being elongated members, they could be relatively short members.

In fact, the advantage of using a pair of spaced apart support members is that in certain cases they give a more even distribution of gas throughout the catalytic element that is achieved where the support member is provided by a manifold. In certain cases, it has been found that where the gas is delivered through radial holes in the manifold, portions of the catalytic element away from the radial holes may be slightly cooler than the portions adjacent the radial holes. Thus, by using the spaced apart support memebrs, this problem, which occurs in certain cases, is readily overcome and by virtue of the fact that the support members are in contact with the catalytic element, adequate heat transfer by conduction is achieved between the catalytic element and the support members. Further, of course, it will be appreciated that considerable amount of heat transfer from the catalytic element to the support member is by way of radiant heat.

Indeed, in certain cases, it is envisaged that where a pair of support members or any other number of support members are used instead of terminating in a single member to engage the soldering portion of the tip or the heating member of the heating device, they could extend directly into the soldering portion or heating memebr. In fact, in certain cases both the support member and the heating member or soldering portion of the tip could be machined from a single piece of material.

It will, of course, be appreciated that other constructions of support members soldering tip or heating member and hollow or cylindrical portions extending from the soldering tip or heating member could be used. Furthermore, any other heat conductive materials besides, copper, brass and aluminium alloy could be used, for example, stainless steel, or other alloys or base metals.

It will of course, be appreciated that other suitable shapes and configurations of handle, or indeed housing, could be used. Needless to say, other shapes and configurations of reservoir could be used.

It is envisaged in certain cases that the means to regulate the flow of gas could be dispensed with altogether, or other suitable means to regulate the gas flow could be used. Similarly, it will be appreciated that other means of isolating the gas from the manifold could be used. For example, it is envisaged that in certain cases a conventional on/off valve could be used, such valves may be a gate valve, a seat valve, a ball valve or any other type of valve which could isolate. Further, it is envisaged that where a carrier arrangement is used to carry a seal to isolate the gas flow, other suitable means of operating the carrier could be used. It will be appreciated that the camming member could be dispensed with, and the slider could operated directly on the carrier. Alternatively, other camming members could be used. Additionally, it will be appreciated that while the slider has been provided in a particular position on the handle, it could be provided in any other suitable position.

It is further envisaged that instead of mixing the fuel gas and air as described, other suitable mixing arrangements could be used. In fact, in certain cases it is envisaged that mixing may be done directly in the neck of a venturi.

It will of course, be appreciated that while a flint ignition mechanism has been provided to ignite the catalytic element of the soldering tool of FIGS. 1 to 29, any other suitable ignition means could be used, for example, a piezoelectric ignition means could be provided. In which case, it is envisaged that the piezo electric ignition mechanism may be activated by the slider 66, although needless to say, this would not be necessary. Other suitable ignition mechanisms will readily be apparent to those skilled in the art. Indeed, it is envisaged in certain cases, that the ignition mechanism may be dispensed with altogether, and an operator could ignite the gas by, for example, a match, or any other naked flame.

While the soldering tool has been described for use with liquid butane gas, it will be appreciated that it could be used with any other suitable gas. In fact, it is envisaged in certain cases, that it is not necessary that the gas is provided in liquified form, it could be provided in compressed form.

It will of course be readily apparent to those skilled in the art, that the soldering tool could also be used for desoldering.

Furthermore, while the reservoir has been described as being formed in the handle any other arrangement of reservoir could be used. Additionally, it will be appreciated that the soldering tool could be arrange to receive a prepacked gas reservoir, for example, a miniature gas cylinder which could, for example, be fitted into a suitable compartment in the handle, or could form part of the handle.

Further, it will be appreciated that while a screwdriver slot has been provided in the shaft 53 for regulating the flow of gas through the regulator, any other arrangement could be used, for example, it is envisaged that a knob, or thumb wheel may be provided on the end of the shaft 53. Further, in certain cases, it is envisaged that the thumb wheel may be provided by a ring extending around the handle intermediate the ends thereof. Indeed, it will be appreciated by those skilled in the art, that any suitable means for adjusting the regulator, could be provided.

Further, it will be appreciated that while the means to regulate the flow of gas, the means to isolate the flow of gas, and the means for mixing gas with air, have been described as being provided in particular sequence in the handle, any other sequence could be used. In fact, it is envisaged in certain cases, that the gas may be regulated after the isolating means, and in certain cases, the gas and air may be mixed before regulation or isolation. Indeed, in certain cases, it is envisaged that the isolating means could in fact, if made sensitive enough, act as a regulating means, and vice versa.

Additionally, it is envisaged that while the means to regulate the flow of gas to the catalytic element has been described as a resilient seal progressively closing the domeshaped end of the filter, other suitable arrangements of a resilient member and a porous member may be used, with departing from the scope of the invention. For example, it is envisaged that the porous member could be provided by a filter with a flat end, and the resilient member could have a domeshaped end. AS the resilient member is compressed, this would have the same effect in progressively sealing the end of the filter. Furthermore, it is envisaged that in certain cases the porous member could be resilient, and the non porous member, in other words, the sealing member, may be rigid. Again, with suitable configurations of the porous and non porous member, a similar sealing effect could be achieved. Further, it is envisaged that the porous member, instead of being provided by a filter, could be merely provided by a domeshaped member which would have a plurality of holes, to permit the passage of gas there-through, or it could be any other domeshaped permeable membrane. Indeed, it is envisaged that in certain cases, the progressive sealing effect could be achieved without having either the porous or non porous member domeshaped. For example, if one of the two adjacent faces of each member were arranged at an angle to the other adjacent face, then a progressive sealing effect could also be achieved.

It is envisaged also that in certain cases the soldering tip and the manifold of the soldering tool of FIGS. 1 to 29 could be formed integrally together, in other words, manufactured from a single piece of material, by, for example, machine or casting. Indeed, it will be appreciated that if desired, the manifold could be arranged to connect directly into the handle portion. Needless to say, whether the manifold was connected directly into the handle portion, or was connected by means of a connecting tube, the connection could be a rigid fixed connection, or a releasable connection. Needless to say, the advantage of having the tip releasably connected to the handle is that firstly, it facilitates replacement of a spent catalytic element, in that the entire tip and manifold portion could be dispensed and replaced. And secondly, it has the advantage that it permits different shape and size soldering tips to be used in the same handle portion.

Further, it will be appreciated that the outlet 93 for securing the tube 33 into the housing 6 of the soldering tool described with reference to FIGS. 1 to 29 could be replaced with a nut similar to the nut 410 described with reference to the glue gun of FIGS. 39 and 40. Thus, the nut would act as a heat sink and reduce the amount of heat being conducted into the housing. Needless to say, such a heat sink nut could be used on any of the devices according to the invention. While it is preferable that the nut should be of a heat conductive metal, it could be of any other suitable material, including a plastics material and preferably a high melting temperature plastics material.

We claim:

1. In a gas powered soldering tool comprising:
a handle;
a soldering tip mounted to said handle,
said soldering tip comprising;
a solid soldering portion body of heat conductive material having a tubular catalytic housing extending rearwardly therefrom to form a combustion chamber;
a gas catalytic combustion element provided within the combustion chamber; and
fuel supply means in the handle for selectively delivering fuel gas to the catalytic combustion element; the improvement comprising; a heat conductive support member having a gas passage forming a gas inlet and a gas outlet, said support member extending through the combustion chamber with said gas outlet opening to said combustion chamber for delivering fuel gas to the catalytic combustion element, said support member having one end directly coupled to the tip solid soldering portion body for conducting heat from the support member to the solid soldering portion body of the soldering tip internally of the catalytic combustion element and for solely supporting the soldering tip, and said support member having the opposite end coupled to the handle and to the fuel supply means.

2. A soldering tool as claimed in claim 1 wherein the permeable gas catalytic combustion element extends completely around the support member.

3. A soldering tool as claimed in claim 1 wherein the support member is a manifold comprising an elongated heat conductive tube having a side wall, and the gas outlet being formed by a plurality of radial holes extending through the tube side wall to deliver fuel gas from the tube to the permeable gas catalytic combustion element.

4. A soldering tool as claimed in claim 1 wherein the support member comprises a pair of spaced apart elongated heat conductive members defining the gas outlet between them, the spaced apart members extending at one end from a base member having a bore therethrough to deliver fuel between the elongated members, the other end of the elongated members being in heat conducting engagement with the soldering portion body.

5. A soldering tool as claimed in claim 4 wherein the spaced apart elongated members terminate in a single heat conductive member which engages the solid soldering portion body with heat conducting engagement.

6. A gas powered soldering tool as claimed in claim 1 wherein the soldering portion body has an axial bore extending therein from one end thereof, and one end of the support member is sized to and fitted into the axial bore of the soldering portion body for effectively conducting heat internally from the support member to the soldering portion body.

7. A soldering tool as claimed in claim 1 wherein at least one exhaust outlet is provided within the tubular catalytic housing for exhausting burnt gases.

8. A soldering tool as claimed in claim 7 wherein a retaining means is provided to retain the catalytic element adjacent the support member and spaced apart from the catalytic tubular housing.

9. A soldering tool as claimed in claim 8 wherein the retaining means is provided by a spring wound round the catalytic element.

10. A soldering tool as claimed in claim 1, wherein said handle has a handle portion which extends from the support member, the handle portion being formed by a housing carrying means for mixing air with fuel gas, means for isolating fuel gas from the catalytic element, and means for regulating the flow of fuel gas.

11. A soldering tool as claimed in claim 1, wherein the soldering tool further comprises a reservoir for fuel gas.

12. A soldering tool as claimed in claim 10 wherein a cover is provided to cover the soldering tip, the cover being releasably engagable with the housing, and a thumb operated flint ignition mechanism is provided in the cover.

* * * * *